United States Patent [19]

Rue

[11] Patent Number: 4,543,107

[45] Date of Patent: Sep. 24, 1985

[54] VITRIFIED BONDED GRINDING WHEELS CONTAINING SINTERED GEL ALUMINOUS ABRASIVE GRITS

[75] Inventor: Charles V. Rue, Petersham, Mass.

[73] Assignee: Norton Company, Worcester, Mass.

[21] Appl. No.: 638,917

[22] Filed: Aug. 8, 1984

[51] Int. Cl.$^4$ .................................................. B24D 3/02
[52] U.S. Cl. .......................................... 51/309; 51/308
[58] Field of Search .................................... 51/308, 309

[56] References Cited

U.S. PATENT DOCUMENTS

| | | | |
|---|---|---|---|
| 2,423,293 | 7/1947 | Ciell | 51/293 |
| 2,441,534 | 5/1948 | Norton, Jr. | 51/309 |
| 2,877,105 | 3/1959 | Smith | 51/309 |
| 3,175,894 | 3/1965 | Foot | 51/309 |
| 3,183,632 | 5/1965 | Ferchland | 51/309 |
| 3,954,930 | 5/1976 | Vasilos et al. | 51/309 |
| 4,314,827 | 2/1982 | Leitheiser et al. | 51/298 |

*Primary Examiner*—Prince E. Willis
*Assistant Examiner*—Willie Thompson
*Attorney, Agent, or Firm*—Rufus M. Franklin

[57] ABSTRACT

Bonding of sintered sol-gel aluminous abrasive grits, comprising sub-micron sized alpha alumina crystals, in vitrified (ceramic) wheels results in abrasive performance superior to premium grade fused alumina in grinding tool-steels. Viscosity of the bond and/or temperature of firing must be controlled to avoid reaction between the bond and the abrasive.

4 Claims, No Drawings

VITRIFIED BONDED GRINDING WHEELS CONTAINING SINTERED GEL ALUMINOUS ABRASIVE GRITS

FIELD OF THE INVENTION

This invention relates to vitrified (glass) bonded grinding wheels containing aluminous abrasive.

BACKGROUND OF THE INVENTION

Heretofore, the best abrasive (other than cubic boron nitride) for use in vitrified grinding wheels for grinding tool steels, e.g. toolroom grinding, have been very high purity alumina grits preferably produced by fusion of alumina in a sulfide matrix, and are essentially monocrystalline particles.

Recently alumina-spinel abrasives produced by the process of U.S. Pat. No. 4,314,827 have appeared on the market in coated abrasive products such as flexible cloth-bonded belts and fiber discs. Such abrasives, although they can be used in making conventional vitrified bonded grinding wheels, perform no better than the best alumina abrasive in dry grinding and are markedly less effective in wet grinding than the premium fused alumina abrasive.

It is an object of this invention to produce a vitrified grinding wheel containing an aluminous abrasive, made by sintering of an alumina gel, which is superior to the conventional fused alumina in vitrified grinding wheels.

DESCRIPTION OF THE INVENTION

I have discovered that, by the use of sintered alumina grits made up of submicron alpha alumina particles having a non-cellular microstructure, vitrified bonded grinding wheels can be made which are markedly superior to such wheels which contain fused alumina as the abrasive.

The abrasive employed in this invention differs from the commercially available sintered gel type abrasive in microstructure in that the commercial abrasives contain the alumina in the form of porous cells or grains having sometimes typically the appearance of sunbursts. The cells are generally coarser than 5 microns, typically 8 to 10 microns, and are single crystals. In the abrasive employed in this invention the cellular or sunburst structure is absent, and the alpha alumina particles are all submicron.

The abrasive useful in the present invention is made by firing at 1250° C. to 1400° C., dried alumina gel particles which contain submicron alpha alumina seed particles in the amount, typically, of about 0.6% by weight. Such alumina gels need not, but may, contain magnesia and need not, but may, contain other additives such as zirconia.

First attempts to use such abrasives in vitrified wheels resulted in total failure due to reaction between the bond and the abrasive. It was then discovered that if the firing temperature of the wheels was reduced to 1100° C. or less, for conventional bonds, or 1220° C. or less for more viscous high alumina and silica bonds, such adverse reaction was avoided. Such extreme sensitivity to firing temperature of the wheel is not found when the prior art sintered gel type alumina or fused alumina grits are employed.

SPECIFIC EMBODIMENT OF THE INVENTION

Alumina grits were prepared by crushing and firing a dried gel containing sub-micron alpha alumina seed particles. The gel was produced by mixing alumina monohydrate powder (microcrystalline boehmite) with water, nitric acid, and about 1 weight % (0.1 to 2%) of submicron alpha alumina particles. After drying of the gel it was broken up and fired at 1350° C. for about 5 minutes. Various examples of production of the abrasive can be found in co-pending U.S. application Ser. No. 06/592,689, filed Mar. 23, 1984, now abandoned, and in co-pending U.S. application Ser. No. 06/620,654 filed June 14, 1984, both of which are incorporated herein by reference.

Wheels were made from the non-cellular, at least 95% dense, abrasive made from seeded gels and compared to wheels made from premium commercially available fused alumina (sulfide process) and from abrasive grits corresponding to Example 41 (alumina and 5% magnesia) of U.S. Pat. No. 4,314,827.

After mixing the abrasive grits with glass bond ingredients, grinding wheels were pressed to shape and to the desired porosity of 45% (the mix including 48 volume % abrasive and 7.1 volume %, as fired, of bond). The wheels were then fired to 1100° C. at a rate of 60° C. per hour, soaked at 1100° C. for 6 hours and then the power was shut off and the wheels allowed to cool in the kiln to room temperature. The bond composition, on an oxide basis was 1 mole of alkali and alkaline earth oxides of composition A, below, and $SiO_2$, $TiO_2$ and $R_2O_3$ oxides identified as composition B, below.

Composition A (mole fractions): $Na_2O$, 0.47; $K_2O$, 0.07; $MgO$, 0.25; $CaO$, 0.21

Composition B (moles per mole of A): $Al_2O_3$, 0.58; $Fe_2O_3$, 0.01; $B_2O_3$, 0.65; $SiO_2$, 3.77; $Ti_2O_3$, 0.03.

The composition of the glass can thus be represented by the empirical formula:

(0.47 $Na_2O$, 0.07 $K_2O$, 0.25 $MgO$, 0.21 $CaO$) 0.58 $Al_2O_3$, 0.01 $Fe_2O_3$, 0.65 $B_2O_3$, 3.77 $SiO_2$, 0.03 $TiO_2$.

In grinding tests the following results were achieved for the 45% porosity (J8) wheels in grinding toolsteel employing 60 grit size (about 400 microns) abrasive:

|  | J8 | | | |
|---|---|---|---|---|
|  | Dry Grind | | Wet Grind | |
| Infeed in Mils | G | Power (Watts) | G | Power (Watts) |
| Fused (32A) ½ | 9.3 | 850 | 3.5 | 900 |
| Sulfide process abrasive 1 | 15.9 | 1300 | 4.0 | 1350 |
| 2 | 5.1 | 1700 | 2.2 | 1800 |
| Sintered Alumina Sol-gel abrasive ½ | 22.6 | 950 | 2.7 | 1000 |
| 1 | 32.3 | 1300 | 3.9 | 1400 |
| 2 | 32.8 | 2200 | 3.5 | 1800 |

Similar wheels made from commercially available sol gel abrasives containing about 5% MgO were inferior to the fused alumina in both dry and wet grinding.

When fired at 1150° C., wheels containing the abrasive of this invention suffered a volume change (increase) of 7.9% and were inferior in grinding performance to the wheels containing the fused alumina (in which no volume change was observed in firing to 1150° C.). The commercial sol-gel abrasives suffered only about 2% linear growth on firing, but were still inferior to the fused abrasive wheels in grinding performance.

It is believed that the growth of the wheels on firing is caused by absorption of the glassy bond into the abrasive grits during firing. The submicron crystal size of the alumina in the grits, apparently being responsible for such attack by the bond, which attack occurs much less in the case of abrasive grits having larger crystal size. While with the conventional glass bond described above, the highest allowable temperature is about 1100° C., variation of the composition of the bond, to produce a more viscous material at the firing temperature, can permit the use of higher firing temperature.

For example, a glassy bond containing a molar ratio of alkali to alumina to silica of 1 to 1 to 6, with 70% of the alkali being potassium, could be fired to 1220° C. without damage to the abrasive.

What is claimed is:

1. A vitrified grinding wheel composed of polycrystalline sintered aluminous abrasive grits and an inorganic glassy bond, said abrasive grits consisting essentially of noncellular submicron alpha alumina particles, said grits having a density of at least 95% of theoretical.

2. A grinding wheel as in claim 1 in which the bond is matured at a temperature at which the integrity of the grits is not adversely affected by the bond.

3. A grinding wheel as in claim 1 which is matured at a temperature of 1220° C. or below.

4. A grinding wheel as in claim 1 which is matured at a temperature of 1100° C. or below.

* * * * *

Dedication 4,543,107.—*Charles V. Rue*, Petersham, Mass. VITRIFIED BONDED GRINDING WHEELS CONTAINING SINTERED GEL ALUMINOUS ABRASIVE GRITS. Patent dated Sept. 24, 1985. Dedication filed Mar. 19, 1990, by the assignee, Norton Co.

Hereby dedicates to the Public the remaining term of said patent.
[ *Official Gazette June 26, 1990* ]